United States Patent [19]

Czerniak

[11] Patent Number: 4,661,075
[45] Date of Patent: Apr. 28, 1987

[54] SELF-PROPELLED WATERBORNE VESSEL

[76] Inventor: Marian K. E. Czerniak, 52 Aspley Park Drive, Nottingham NG8 3EG, England

[21] Appl. No.: 713,397
[22] PCT Filed: Jul. 7, 1983
[86] PCT No.: PCT/GB84/00258
    § 371 Date: Mar. 12, 1985
    § 102(e) Date: Mar. 12, 1985
[87] PCT Pub. No.: WO85/00572
    PCT Pub. Date: Feb. 14, 1985

[30] Foreign Application Priority Data

Jul. 20, 1983 [GB] United Kingdom ............... 8319670

[51] Int. Cl.$^4$ ............................................. B63H 5/16
[52] U.S. Cl. ............................ 440/69; 114/67 A; 114/288
[58] Field of Search ............... 114/288–290, 114/67 A, 148; 440/66–69

[56] References Cited

U.S. PATENT DOCUMENTS

| 985,187 | 2/1911 | Lindgren | 440/69 |
| 1,412,517 | 4/1922 | Goldson | 440/68 |
| 2,347,785 | 5/1944 | Lovell | 440/67 |
| 3,137,265 | 6/1964 | Meyerhoff | 440/67 |
| 3,267,898 | 8/1966 | Evans | 114/67 A |
| 3,848,561 | 11/1974 | Price | 440/69 |
| 4,175,511 | 11/1979 | Krautkremer | 440/54 |
| 4,371,350 | 2/1983 | Kruppa et al. | 440/69 |

FOREIGN PATENT DOCUMENTS 28755 10/1897 United Kingdom ................ 440/69

Primary Examiner—Joseph F. Peters, Jr.
Assistant Examiner—Jesûs D. Sotelo
Attorney, Agent, or Firm—Young & Thompson

[57] ABSTRACT

A self-propelled waterborne vessel has a generally flat hull undersurface aft of the bow region from which extend side walls (10) and keels (11, 12) defining longitudinally extending channels (8, 9) of which the length approximates to one-third of the length of the vessel. Ducted portions of the channels contain propellers (21) aft of which the ducted portion cross-section is selectively variable by transversely pivoted vanes (18). The attitude of the vessel is controllable by the vanes (18) and by further vanes (36) at the stern. Steering is effected by a propulsive steering unit (25) comprising ducts containing propellers (32) and transversely pivoted vanes (34). Additional ducted propellers (46) can be provided aft and may be retractable into the hull.

16 Claims, 6 Drawing Figures

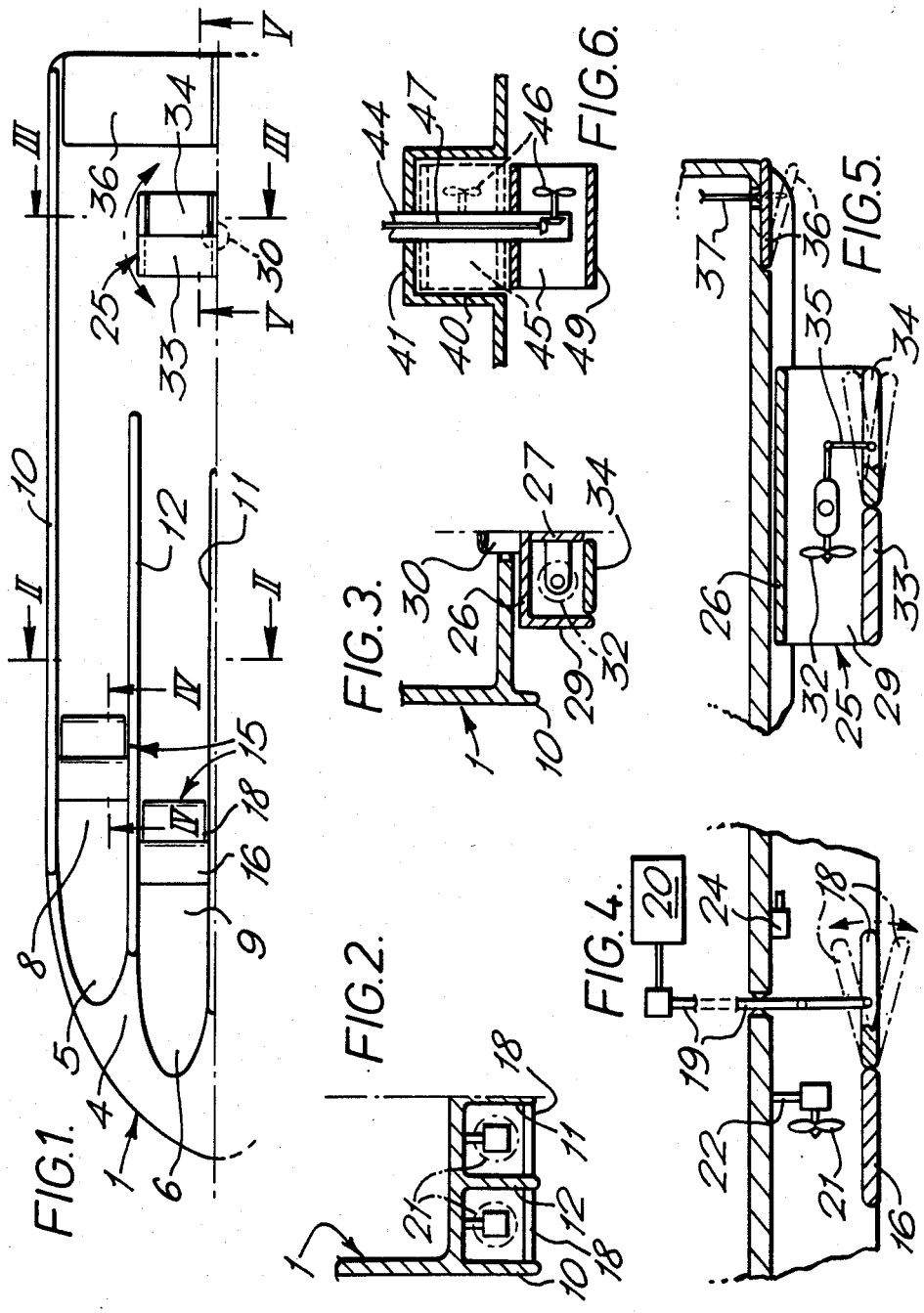

SELF-PROPELLED WATERBORNE VESSEL

DESCRIPTION

The invention relates to a self-propelled water-borne vessel.

Patent Specification GB 1 460 947 discloses a self-propelled waterborne vessel in the form of a displacement ducted craft wherein the undersurface of the hull forms a duct at the bow section and an inverted open parallel channel from the middle of the bow to the stern. The duct is provided with power operated water propellant means for propelling water along it. Waterborne vessels embodying the invention disclosed in Specification GB 1 460 947 show considerable improvements in efficiency as compared with conventional vessels, and the present invention is concerned with a self-propelled waterborne vessel, the efficiency of which is still further increased.

In accordance with the invention there is provided a self-propelled waterborne vessel having a hull undersurface shaped to define at least one longitudinally extending channel and propulsion means for propelling water along the channel, the channel having a portion of substantially constant cross-section upstream of the propulsion means and being of variable cross-section downstream thereof.

Preferably, the variation of the channel cross-section is effected by a vane mounted to span across the channel and to be pivoted on a transverse axis. The vane can be pivoted at its forward edge on a fixed vane spanning the channel beneath the propulsion means. A duct for the water moved by the propulsion means is thus created whereby pressure on the bow region of the vessel is reduced and the channel structure strengthened.

In the duct and channel arrangement of the vessel disclosed in Specification GB 1 460 947, a water propellant means is provided in a portion of the duct of which the cross-sectional area diminishes from the bow to the region at which the duct opens into the channel. It has now been found that a channel configuration in accordance with the present invention, in which the propulsion means operates on a stable flow of water in the channel, due to the provision of the upstream portion thereof of substantially uniform cross-section, together with the downstream portion of variable cross-section, provides improved performance and efficiency.

The hull undersurface can be generally flat, with a bow shape and downwardly projecting side walls and/or keels to define the propulsion channel or channels. The or each channel can be generally rectangular in cross-section and can have a length approximating to one third or one half of the length of the vessel. The bow portion of the hull undersurface can be flared in a generally conventional way but is provided with a groove forming the leading portion of the or each channel. Preferably a vessel embodying the present invention is provided with a plurality of the channels defined by the bow and between such side walls and keels, the channels being spaced apart or located in direct adjacency.

A vessel embodying the invention can be provided with additional propulsion means in the stern region. Such additional propulsion means can be arranged to be retractable into the hull during normal operation of the vessel, use being made of them when exceptional power is required, as when great speed is necessary or when the vessel has to tow a large load. The additional propulsion means can comprise one or more propeller or hydrojet propulsion units which can be accommodated in channels or ducts aligned with the first-mentioned propulsion channels.

A vessel in accordance with the invention can be provided with conventional steering means, or steering can be effected by speed adjustment of the propulsion means in adjacent or laterally spaced channels together with speed adjustment of the additional propulsion means if fitted. The additional propulsion means can however be mounted at the hull underside for movement to constitute propulsive steering means. The propulsive steering means can then comprise a propulsion unit supported for rotation about a generally vertical axis so as to apply to the vessel a propulsive force in a selectively variable direction. Preferably, the propulsive steering means comprise a plurality of propellers or other propulsion units each received within a respective short channel or tunnel of fixed or variable cross-section and symmetrically disposed about the steering axis.

Also according to the invention there is provided a waterborne self-propelled vessel having a plurality of spaced apart propulsion units, lift adjustment means associated with each propulsion unit for adjusting the lift supplied thereby to the vessel, and control means responsive to the attitude of the vessel to control the lift adjustment means so as to maintain in a stable manner a selected or predetermined attitude of the vessel.

Such a vessel can incorporate a plurality of the longitudinally extending propulsion channels described above, laterally spaced on the hull undersurface, the lift adjustment means comprising vanes extending across the channels and being pivotable about transverse axes so as to enlarge or constrict the effective channel cross-sectional area in regions just downstream of the propulsion means, to thereby generate positive or negative lift respectively. Such an arrangement will provide controlled lateral stabilization, and to provide for pitch stabilization, additional lift adjustment means are provided rearwardly of the propulsion channels. Such additional lift adjustment means can comprise a propulsion unit received in a short channel with a pivotable vane extending across it for control in the same manner as described above for the main propulsion channel. Two or more such additional lift adjustment means can be laterally spaced to provide roll stabilization and controlled propulsion, and where the propulsive steering means described above are fitted, these can comprise adjacent short channels with pivotable vanes so as to combine steering, propulsion and stabilization functions. In addition, the hull undersurface at the stern of the vessel can be formed as one or more movable vanes to provide lift and stabilization.

The various lift adjustment means are preferably incorporated in a gyroscopic control system but provision can be made for manual control instead or as well if desired.

A vessel embodying the invention can be employed to pull a barge or train or barges without separate propulsion means, the or each barge preferably having a hull underside shaped similarly to that of the vessel, so that the channel or channels of the latter are continued beneath the succeeding vessel or vessels. Two vessels embodying the invention, each having one or more of the propulsion channels, can be constructed so as to be connectable together to constitute a single vessel, with or without an intermediate member, so as to provide for example a substantial platform area for use as a helicopter pad.

The invention will be understood to provide a vessel which by virtue of its propulsion arrangements, which reduce or substantially eliminate the bow wave produced by conventional vessels, affords substantial improvements in efficiency. The effect of the wash on for example canal banks and bottom due to the passing vessel is sharply reduced or nearly eliminated. The invention lends itself to the production of a relatively broad beamed vessel of shallow displacement, so that there is reduced risk of grounding for example in shallow estuaries, and which provides a large and advantageously disposed usable volume. A vessel embodying the invention can readily incorporate effective stabilizing means.

The invention will be better understood from the following illustrative description and the accompanying schematic drawings, in which:

FIG. 1 is a partial underneath view of a vessel embodying the invention;

FIGS. 2 and 3 are partial sectional views on the line II—II and III—III of FIG. 1 respectively;

FIGS. 4 and 5 are fragmentary sectional views on the lines IV—IV and V—V of FIG. 1 respectively, on a slightly larger scale; and FIG. 6 is fragmentary sectional view corresponding to that of FIG. 5 of a modified vessel according to the invention, showing a retractable additional propulsive means, with a steering control facility.

The illustrated vessel 1 has a hull with a conventional or other superstructure (not shown) appropriate to the intended function of the vessel. The greater length of the hull undersurface 4 is generally flat, but in the region of the bow, the undersurface is flared in a generally conventional way except in that four longitudinally extending grooves 5,6 are formed in it. The grooves 5,6 broaden out from the bow to transverse positions at which they lead into respective channels 8 and 9 defined on the flat undersurface portion by side walls 10, a centre keel 11 and intermediate keels 12. The sidewalls 10 and keels 11 and 12 all extend below the flat undersurface portion by substantially the same distance, which is constant along their lengths.

Because of the shape of the flared forward portion of the hull undersurface 4, the forward edges of the sidewalls 10 and the three keels 11 and 12 are staggered, the leading edge of the centre keel being forward of the leading edges of the intermediate keels and these leading edges being forward of the leading edges of the sidewalls. The sidewalls 10 extend substantially half the length of the hull and continue with reduced depth to the stern of the vessel 1, but the three keels 11 and 12, which are of substantially equal length, can extend rearwardly for about a third up to rather more than half of the length of the hull. The four channels 8 and 9 are thus of substantially equal length; they are also of substantially equal, uniform, rectangular cross-section.

At positions substantially equally spaced from their forward ends, each channel 8 or 9 includes a propulsion unit 15. At the propulsion unit, the channel is closed below by a transverse guide vane 16 extending across it between the keels or the keel and side wall by which it is defined. The trailing edge of the vane 16 has a control vane 18 connected to it for pivoting about a generally horizontal axis extending transversely of the hull. The control vanes 18 will normally lie in substantial alignment with the guide vanes 16 but can be selectively pivoted upwardly or downwardly from this position as shown in broken line in FIG. 4, by actuation of a control linkage 19. The linkage 19 may be power driven for example hydraulically and may be controlled manually or by a control unit 20.

A propulsion element in the form of a propeller 21 is mounted by means of a support 22 between the hull undersurface and each guide vane 16, at a longitudinal position between the leading and trailing ends of the vane. A drive is applied to the propellers through the supports 22 from one or more motors (not shown) accommodated within the hull. Instead of the propellers 21, other propulsion units for example hydrojets could be employed.

It will be evident that movement of the control vanes 18 will effectively restrict or enlarge the cross-section of the channels 8,9 immediately downstream of the propellers 21, so as to control propulsion and negative or positive lift respectively.

Nozzles 24 can be provided downstream of each propeller 21 through which compressed air from a source accommodated within the hull can be supplied to form a thin layer of air between the hull undersurface and the water flowing in each channel.

The vessel 1 may be provided with a conventional rudder, but preferably a propulsive steering unit 25 is provided as shown. The propulsive steering unit 25 is located towards the stern of the vessel on the flat hull undersurface rearward of the keels 11,12 and comprises a rectangular upper wall 26 extending parallel to and adjacent the hull undersurface. A centre wall 27 and two side walls 29 extend at right angles downwardly from it to define two like channels which extend longitudinally of the vessel 1 when this is steered in the straight ahead direction.

The upper wall 26 is however suspended from the hull by a sleeve 30 which is journalled in the hull so that the unit 25 can be rotated about a generally vertical axis extending through the centre of the wall. Within the forward part of each channel a propeller 32 or other propulsion element is mounted on a support extending from the centre wall 27, the drives to the propellers being taken through the sleeve 30, the centre wall and the supports from motors (not shown) in the hull.

Between the centre wall 27 and each side wall 29 there extends beneath the propeller 32, a guide vane 33 having pivoted at the trailing edge thereof a control vane 34 capable of selective pivoting about a horizontal transverse axis by actuation of a control linkage 35 extending through the sleeve 30. The control linkage 35 can be power driven and can be controlled, like the linkage 19, manually or by the control unit 20.

The unit 25 will be understood to be able to function as an additional propulsion means, and in a modified vessel according to the invention it is provided for this purpose alone, without the facility for rotation about the vertical axis. Whether or not the unit is so rotatable, it can be mounted from the underside of the hull for retraction within it when not required. The unit can then be received within a recess opening upwardly from beneath the hull, the recess being closed off flush with the adjoining hull undersurface by the upper wall of the unit when this is in use and, when the unit is retracted, by the vanes of the units or by a separate movable door portion of the hull.

Each side of the steering unit 25 will be seen to correspond generally to one of the propulsion units 15 included in the propulsion channels 8,9. Instead of the propulsive steering unit 25, with its two-sided structure, one or more separate units, each generally corresponding in structure to one of the units 15, can be provided at spaced positions beneath the hull to function as a single or spaced propulsive steering units or as a single or spaced additional propulsive units, the unit or units being optionally mounted for retraction into the hull as described above.

Thus in the modified vessel of FIG. 6, the hull is formed with a rectangular recess 40 of which the top wall 41 is apertured to sealingly receive therethrough a sleeve 44 which can be moved axially and rotated on its axis. At its lower end the sleeve carries the upper wall of a rectangular open ended duct member 45 into which the sleeve projects. At its lower end the sleeve mounts a propeller 46 which is driven through suitable gearing by a shaft 47 which extends axially within the sleeve 44 from a motor (not shown) and which is extensible and contractible with axial movement of the sleeve.

As shown, the duct member 45 is in its lower, operative, position, with the axis of the propeller 46 aligned along the fore-to-aft axis of the vessel. For steering purposes, the sleeve 44 can be rotated axially. When not required, the duct member 45 is aligned with the fore-to-aft axis of the vessel and raised by upward movement of the sleeve 44 to the position shown in broken line, in which the lower wall 49 of the duct member is flush with the adjacent flat wall of the hull.

At or towards the stern, the undersurface 4 of the vessel is provided with a pair of vanes 36 positioned side-by-side and pivoted at their leading edges on a common transverse axis for downward movement through a selected angle as indicated in broken line in FIG. 5. The vanes 36 can be moved together or by different amounts by actuation of linkages 37 which may again be power driven and controlled manually or by the control unit 20, depending on the desired effect on the attitude of the vessel.

In operation of the vessel 1, the propellers 21,32 in the propulsion channels 8,9 and the steering unit 25 will be operated at equal speeds and the vessel will advance substantially without a bow wave and consequently with very efficient use of fuel. Independent speed control and reverse control facilities are provided for the six propellers 21,32, so that the vessel can alter course by arranging for the propellers on one side of the vessel to rotate more slowly than those on the other, and/or by turning the steering unit 25. For manoeuvring at low speeds, the steering unit 25 can be rotated and the propellers 21 reversed on one side of the vessel. By these control means, the vessel 1 can be turned practically in its own length, and because of the virtual absence of a bow wave it can very readily be brought into close adjacency with another vessel at speed.

The pivotable vanes 18,34 provided in the propulsion channels 8,9 and steering unit 25 and the stern vanes 36 will normally extend horizontally, but can be pivoted so as to stabilise the vessel in water conditions that would otherwise cause heaving, pitching and/or rolling of the vessel. Thus, if the vances 18 on the port side of the vessel are pivoted upwardly and those on the starboard side are pivoted downwardly, the effect will be that negative lift is created on the port side and positive lift on the starboard side. In this way, lateral stability of the vessel can be readily obtained. In a similar way, the adjustable vanes 34 of the steering unit 25 and the vanes 35 can be operated so as to maintain longitudinal stability. The vanes can be operated manually or by control means but control is preferably effected by the control unit 20 which incorporates an automatic stabilisation system, conveniently under gyroscopic control, so that the vessel is maintained stable automatically.

It will be evident that the invention can be embodied in a variety of ways other than as specifically described and illustrated.

I claim:

1. A self-propelled waterborne vessel having a hull,
   means defining at least one channel extending longitudinally of the underside of said hull,
   propulsion means for moving water along said channel,
   said channel having a portion of substantially uniform cross-section forward of said propulsion means,
   means for selectively varying the cross-section of said channel aft of said propulsion means, and
   at least one additional propulsion means aft of said channel, said additional propulsion means being selectively movable so as to control the direction of movement of said vessel.

2. The vessel of claim 1 wherein said additional propulsion means is retractable within said hull.

3. The vessel of claim 1 wherein said additional propulsion means is retractable into a recess in said hull, and wherein a wall is movable to a position flush with the undersurface of said hull to close said recess when said additional propulsion means is retracted therein.

4. The vessel of claim 1 further characterized by a channel member having said additional propulsion means received therein, said channel member being rotatable about a generally vertical axis.

5. The vessel of claim 1 wherein said channel member has vane means extending thereacross beneath said additional propulsion means.

6. The vessel of claim 5 wherein said vane means has a portion aft of said additional propulsion means, said vane portion being selectively pivotable about an axis which extends transversely of the vessel when said additional propulsion means is in the straight ahead position.

7. A self-propelled waterborne vessel comprising:
   a hull,
   walls defining at least one downwardly opening channel extending longitudinally of said vessel beneath said hull,
   propulsion means located underneath said hull within said channel operable to move water along said channel,
   vane means extending across said channel beneath and adjacent said propulsion means,
   said vane means being selectively operable to vary the effective cross-sectional area of said channel aft of said propulsion means.

8. The vessel of claim 7 wherein said vane means comprise a fixed vane extending between said walls, a control vane aft of said fixed vane, means mounting said control vane for pivoting about an axis extending transversely of said channel, and means for selectively moving said control vane upwardly or downwardly from a position of substantial alignment with said fixed vane.

9. The vessel of claim 7 wherein said at least one channel is of at least approximately uniform cross-section forward of said propulsion means.

10. The vessel of claim 7 wherein said hull has a bow region, and a generally flat undersurface extending aft of said bow region, said walls depending from said undersurface to define said at least one channel therewith.

11. The vessel of claim 10 wherein said at least one channel extends from said bow region over approximately one third of the length of the vessel.

12. The vessel of claim 7 having a plurality of said channels laterally spaced beneath said hull and further characterized by control means adapted to operate said vane means to maintain a predetermined attitude of said vessel.

13. The vessel of claim 7 having a plurality of said channels laterally spaced beneath said hull, and means for selective relative adjustment of the speed of said propulsion means in the channels to effect steering of the vessel.

14. The vessel of claim 7 further characterized by at least one additional propulsion means located aft of said at least one channel, said at least one additional propulsion means being movably mounted so as to control the direction of movement of the vessel.

15. The vessel of claim 7 further characterized by an additional propulsion means aft of said at least one channel, lift adjustment means associated with said at least one additional propulsion means, and control means adapted to operate said vane means and said lift adjustment means so as to maintain a desired attitude of said vessel.

16. A waterborne self-propelled vessel having a hull,
a plurality of propulsion units located beneath said hull and symmetrically disposed with respect to the longitudinal center line of said hull,
a plurality of channels extending longitudinally of said hull, each of said propulsion units being located in a respective one of said channels,
lift adjustment means co-operatively associated with each of said lift adjustment means comprising vane means extending across said channel beneath the associated propulsion unit, said vane means being pivotable about an axis extending transversely of said channel selectively to enlarge the effective cross-sectional area of said channel downstream of said propulsion unit to thereby generate positive lift and to constrict said effective cross-sectional area to thereby generate negative lift, and
control means adapted to operate said lift adjustment means so as to maintain a desired attitude of the vessel.

* * * * *